United States Patent [19]

Harbali et al.

[11] Patent Number: 5,685,527
[45] Date of Patent: Nov. 11, 1997

[54] TORSION SPRING ADJUSTMENT APPARATUS

[75] Inventors: Mohamed Mouin Harbali, Farmington Hills; Mark Anthony Roberts, Whitmore Lake, both of Mich.

[73] Assignee: Ford Global Technologies, Inc.

[21] Appl. No.: 464,423

[22] Filed: Jun. 5, 1995

[51] Int. Cl.$^6$ ................................ B66G 11/18
[52] U.S. Cl. .................. 267/277; 267/258; 280/664
[58] Field of Search .................. 280/663, 664, 280/665, 700, 717, 721; 267/277, 278, 228, 257, 258, 279–282; 384/902, 908, 911

[56] References Cited

U.S. PATENT DOCUMENTS

| | | |
|---|---|---|
| 2,202,665 | 5/1940 | Metz ............................. 280/663 |
| 2,561,548 | 7/1951 | Wharam et al. . |
| 2,596,922 | 5/1952 | Thomas . |
| 2,606,758 | 8/1952 | Collier . |
| 2,624,568 | 1/1953 | Kany . |
| 2,715,022 | 8/1955 | Krotz . |
| 2,852,269 | 9/1958 | Gaines . |
| 2,855,212 | 10/1958 | Houser . |
| 3,093,390 | 6/1963 | Muller ............................ 280/663 |
| 3,104,096 | 9/1963 | Eirhart, Jr. . |
| 3,178,200 | 4/1965 | Backaitis et al. . |
| 3,337,233 | 8/1967 | Cadiou ............................ 280/664 |
| 3,432,158 | 3/1969 | Goodwin . |
| 3,869,113 | 3/1975 | Dudek ............................ 267/282 |
| 4,033,605 | 7/1977 | Smith et al. . |
| 4,243,247 | 1/1981 | Kataoka .......................... 280/721 |
| 4,274,858 | 6/1981 | Claassen et al. ................. 65/273 |
| 4,415,178 | 11/1983 | Hatsuchi et al. . |
| 4,488,736 | 12/1984 | Aubry et al. . |
| 4,635,958 | 1/1987 | Yonemoto ...................... 280/721 |
| 4,854,766 | 8/1989 | Hein . |
| 5,112,031 | 5/1992 | Hynds et al. . |
| 5,297,874 | 3/1994 | Raines ........................... 267/141.1 |
| 5,439,203 | 8/1995 | Hadano .......................... 267/140.12 |

FOREIGN PATENT DOCUMENTS

| | | |
|---|---|---|
| 2 504 069 | 10/1982 | France . |
| 732 206 | 2/1943 | Germany . |
| 1 965 464 | 7/1970 | Germany . |
| 129626 | 10/1950 | United Kingdom . |

*Primary Examiner*—Robert J. Oberleitner
*Assistant Examiner*—Chris Schwartz
*Attorney, Agent, or Firm*—Gregory P. Brown

[57] ABSTRACT

A suspension adjuster apparatus (46) suitable for use in a motor vehicle having a tension strut 42 interposed and connecting a chassis 10 to a wheel support member 26 is described. The apparatus (46) ensures proper orientation of the suspension member (42) during the assembly process. Additionally, the apparatus provides vibration isolation (68) while limiting rotation of the suspension member (42) relative to the chassis (10) within a predetermined range.

18 Claims, 3 Drawing Sheets

TORSION SPRING ADJUSTMENT APPARATUS

BACKGROUND OF THE INVENTION

1. Field of the Invention

This invention relates generally to a torsion spring suspension for use on a motor vehicle. More particularly, the present invention relates to a torsion spring adjustment apparatus for retaining a torsion spring in a predetermined orientation and preload.

2. Disclosure Information

Torsion spring suspensions are well known in the motor vehicle industry. The design is desirable for its ability to provide simplified, low cost ride height adjustments to compensate for vehicle build tolerances and weight variations of vehicles having different customer preferred options.

One problem associated with torsion spring suspensions relates to the dynamic reaction load imposed on the vehicle structure at the spring adjuster seat. To minimize the stresses throughout the suspension components when subjected to these dynamic reaction loads, it is beneficial to provide a floating adjuster for the torsion spring at the vehicle structure. Thus, a floating torsion spring adjuster must maintain a predetermined angular orientation, which in turn maintains a predetermined preload in the torsion spring, while allowing the torsion spring to float laterally and axially in response to various suspension movements, including recession, jounce and rebound. While this effectively reduces stresses within the suspension components, the looseness of the adjuster may result in the generation of objectional operational noises. One of these objectionable noises is best described as a clunk. Conventional elastomeric isolators have been unsatisfactory as they typically do not last long when subjected to the dynamic reaction loads imposed by the torsion spring.

It would be desirable to provide a torsion spring adjuster that minimizes the stresses in the suspension components by using a floating adjuster at the vehicle structure while preventing the generation of objectionable noises, such as clunk.

SUMMARY OF THE INVENTION

According to the present invention, a torsion spring adjuster is disclosed for use in a motor vehicle having a torsion bar suspension. The adjustment apparatus includes an adjuster seat disposed on a structural support member of the motor vehicle and an adjuster having an outer surface seated against the adjuster seat. The adjuster also includes a non-circular aperture for receiving one end of a torsion bar therein, the adjuster being operative to maintain the torsion bar in a predetermined orientation and preload.

The adjustment apparatus also includes a resilient pad disposed on the outer surface of the adjuster, between the adjuster and the adjuster seat. The resilient pad is operative to reduce noise generated by the operation of the torsion bar suspension.

An advantage of this torsion spring adjuster apparatus is to provide a torsion spring suspension in which the rearward end of the spring is angularly adjustably mounted upon the structural support member to permit adjustment of the riding height of the vehicle without imparting vibration or noise into the motor vehicle during operation of the vehicle suspension.

DETAILED DESCRIPTION OF THE PREFERRED EMBODIMENT

Figure 1:
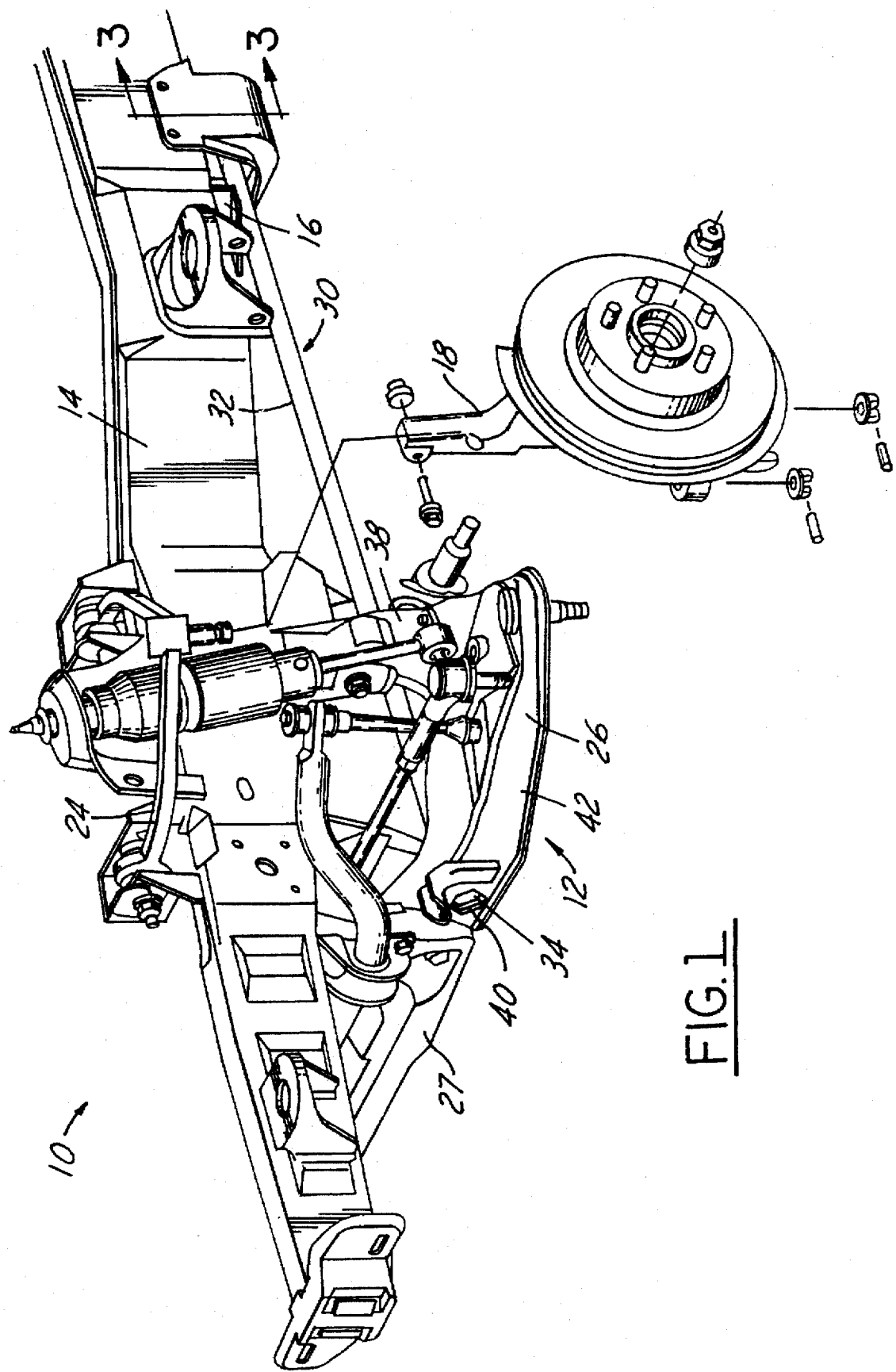
FIG. 1 is a perspective view of a front portion of a motor vehicle chassis provided with an independent torsion spring suspension in accordance with the present invention.

Referring now to FIG. 1, a motor vehicle chassis 10, includes a left independent front suspension 12 of the torsion spring type depending from a left side member 14 of a vehicle frame. It should be noted that a unitized body may be used as an alternative to a body on frame design with equivalent operability and functionality. There is also a structural support member 16, extending between the left side member 14 and a right side member (not shown). Since the suspension system for each front wheel is identical, only that for the left side will be described in detail.

The left front wheel (not shown) is rotatably mounted on a wheel support member 18 which is pivotally connected to the outer ends of upper and lower vertically spaced transversely extending control arms 24 and 26 of a V or wishbone shape. The inboard ends of the upper control arm 24 are pivotally connected to the vehicle frame 14. The inboard ends of the lower control arm 26 are also pivotally connected to a front cross member 27 on the vehicle frame 14.

A longitudinally extending torsion spring 30 in the form of a bar or rod extends between the lower suspension arm 26 and the structural support member 16 and is arranged to resiliently restrain swinging movement of the front wheel suspension 12 in an upward direction relative to the vehicle frame 14. The torsion spring 30 has a straight body portion 32 arranged in axial alignment with the rotational axis of the lower control arm 26. The torsion spring 30 has its forward end formed as a hexagonal flange 34. The flange 34 passes through an aperture (not shown) on a rearward leg 38 of the lower control arm 26 and matingly engages a matching hexagonal aperture 40 on the forward leg 42 of the lower control arm 26.

Figure 2:
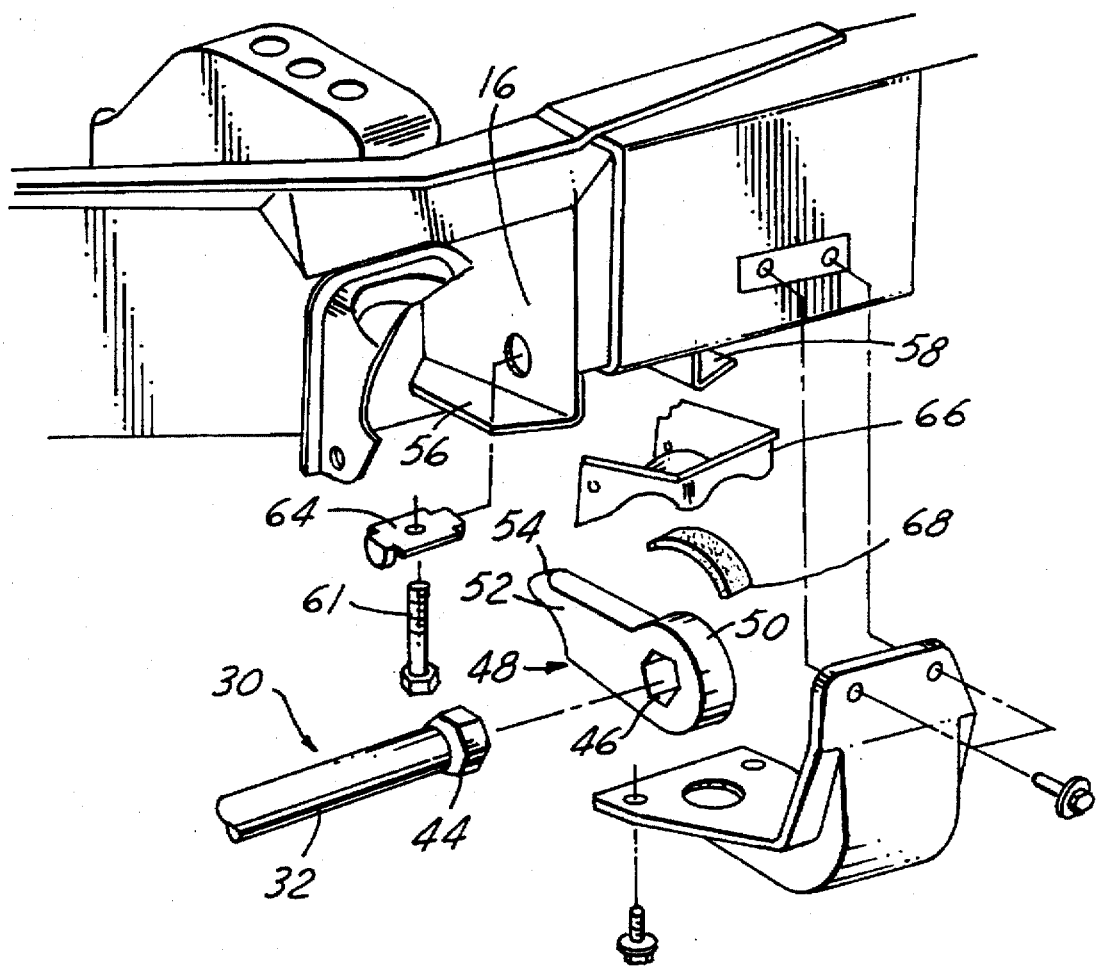
FIG. 2 is an exploded perspective view of the torsion spring adjuster apparatus according to the present invention.
Figure 3:
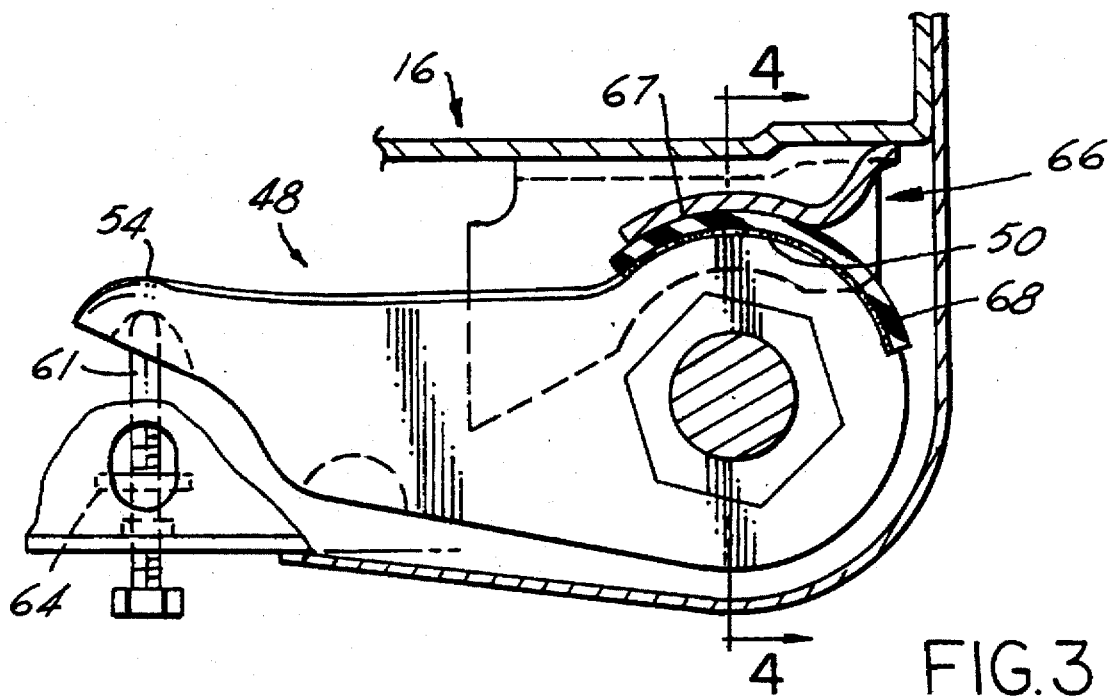
FIG. 3 is a front end elevation of the torsion spring adjuster apparatus according to the present invention.
Figure 4:
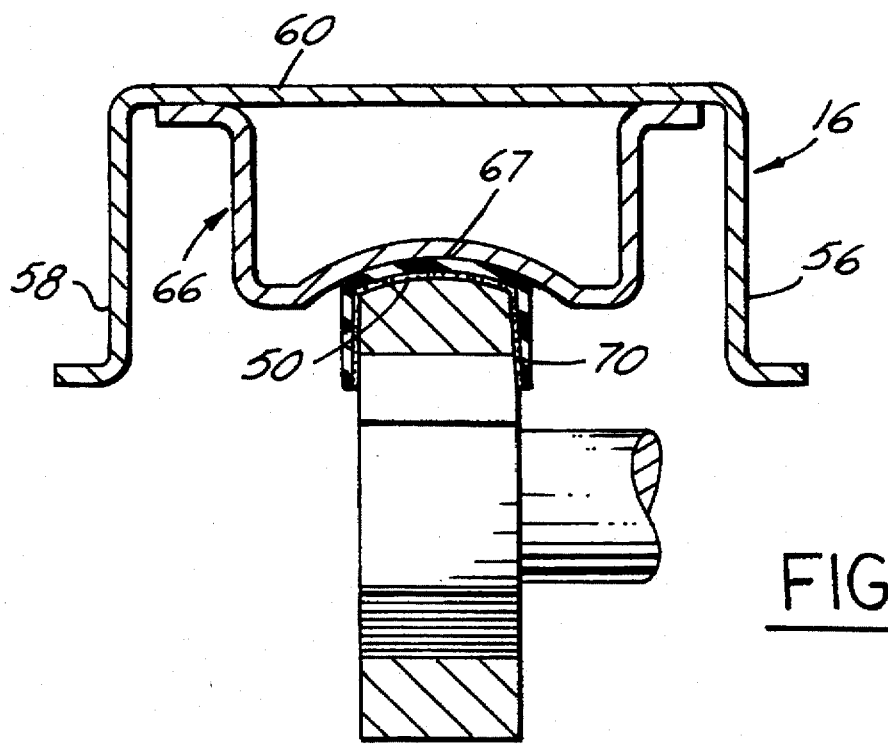
FIG. 4 is a sectional view taken from FIG. 3 of the torsion spring adjuster apparatus according to the present invention.

Referring now to FIGS. 2–4, the rearward portion of the torsion spring 30 is formed as a hexagonal flange 44 which matingly engages a non-circular aperture 46 on an adjuster 48. The adjuster also includes a semicircular or semispherical outer surface 50 centered about a longitudinal axis of torsion spring 30. The adjuster 48 also includes an adjuster arm 52 that extends radially outward and terminates at an arm tip 54.

The structural support member 16 is in the form of a hat section and comprises front and rear portions 56, 58 depending substantially perpendicularly from a center portion 60. The arm tip 54 of the adjuster 48 abuts an adjuster bolt 61 threaded in a support nut 64. The support nut 64 is positioned between the front and rear portions 56, 58 of the structural support member 16. Recesses formed in opposite ends of the support nut 48 engage edges of apertures in the front and rear portions 56, 58 to prevent horizontal movement of the nut relative to the structural support member 16. The bolt 61 extends downward from the structural support member 16 exposing the head of the bolt 61 for easy adjustment.

It will be noted that the upper end of the adjusting bolt 61 is rounded to provide a point engagement with the spherical arm tip 54 of the adjuster 48. A minimum of frictional resistance to movement of the adjuster 48 relative to the adjusting bolt 61 is thus present and bodily movement of the adjuster 48 relative to the structural support member 16 is permitted.

An adjuster seat 66 is securely positioned against the center portion 60 of the structural support member 16. The adjuster seat 66 includes a semi-circular or semi-spherical recess 67 that conforms to the outer surface 50 of the adjuster 48.

A resilient pad 68 is placed between the outer surface 50 of the adjuster 48 and the recess 67 of the adjuster seat 66. In the presently preferred embodiment the pad 68 consists of a fluoroelastomer blended with polytetrafluoroethylene and is reinforced with an aramid fiber. The materials chosen for use in the presently preferred embodiment have more commonly known trade names, such as VITON for the fluoroelastomer, TEFLON for the polytetrafluoroethylene and KEVLAR for the aramid fiber. Also, an adhesive patch 70, such as an epoxy, may be used to bond the resilient pad 68 to the outer surface 50 of the adjuster. It has been found beneficial to use an epoxy including a predetermined amount of aluminum filler. It has also been found to be beneficial to provide an oversized resilient pad and an excess amount of epoxy, which together, forms a larger bearing surface than would otherwise be presented by the outer surface 50.

The manufacture of the individual resilient pads 68 begins with a sheet of fabric constructed from aramid fibers. The sheet is dipped in a bonding agent to enhance the bonding of the fluoroelastomer blended with polytetrafluoroethylene to the sheet. The sheet is then transferred to a press where it is pressed to a predetermined thickness and cured at a predetermined temperature and pressure. In the presently preferred embodiment, the sheet is cured at 300 degrees Fahrenheit at a pressure of 150 pounds per square inch. The finished sheet is provided with a matte finish to improve the subsequent bonding process. The sheet is oriented so that its maximum tensile strength is substantially aligned with the longitudinal axis of the torsion spring. At this point the sheet is sheered into resilient pads 68 and is ready to be bonded to the adjuster 48.

Next, the adjuster 48 is preheated to 250 degrees Fahrenheit to speed the curing of the epoxy bond. The resilient pad 68 is positioned in a mold cavity and a predetermined amount of epoxy is applied to the resilient pad 68. The preheated adjuster 48 is clamped into the mold on top of the epoxy and the resilient pad 68. After a predetermined period of time, depending on the epoxy used and the curing temperature, the epoxy is cured to the adjuster 48 is ready for installation in the vehicle.

During operation, upward movement of the lower suspension arm places the torsion spring under torsional stress, and inasmuch as the rearward end of the torsion spring is mounted for floating movement, the cooperating arcuate surfaces of the adjuster seat 58 and the adjuster 48 guide the rear end of the torsion spring to its own natural position in axial alignment with the forward end of the torsion spring 30. During recession of the lower control arm 26, the adjuster seat 58 and the adjuster 48 permit the torsion spring to move in a rearward direction. Thus, the floating adjuster prevents significant bending stresses from building up in the torsion spring and in the remainder of the suspension system.

The foregoing description presents one embodiment of the present invention. Details of construction have been shown and described for purposes of illustration rather than limitation. Modifications and alterations of the invention will no doubt occur to those skilled in the art that will come within the scope and spirit of the following claims.

What is claimed:

1. A torsion bar adjustment apparatus for use in a motor vehicle having a torsion bar suspension, said adjustment apparatus comprising:

an adjuster seat disposed on a structural support member of the motor vehicle;

an adjuster having an outer surface seated against said adjuster seat and a non-circular aperture for receiving one end of a torsion bar therein, said adjuster being operative to maintain said torsion bar in a predetermined orientation and preload; and a resilient pad disposed on said outer surface of said adjuster and comprising a synthetic rubber sheet for vibration isolation and a fabric mat for improved durability of said resilient pad, said resilient pad being operative to reduce noise generated by the operation of the torsion bar suspension.

2. A torsion bar adjustment apparatus according to claim 1, wherein said resilient pad further includes an adhesive patch disposed between said outer surface of said adjuster and said resilient pad.

3. A torsion bar adjustment apparatus according to claim 2, wherein said adhesive patch includes a predetermined amount of aluminum filler, whereby said aluminum filler provides an improved bearing surface.

4. A torsion bar adjustment apparatus according to claim 1, wherein said fabric mat is manufactured from KEVLAR.

5. A torsion bar adjustment apparatus according to claim 1, wherein said sheet of synthetic rubber includes a predetermined amount of polytetraflouroethylene.

6. A torsion bar adjustment apparatus according to claim 1, wherein said outer surface of said adjuster is spherical.

7. A torsion bar adjustment apparatus for use in a motor vehicle having a torsion bar suspension, said adjustment apparatus comprising:

a structural support member;

an adjuster seat disposed on said structural support member;

a support nut disposed within said structural support member;

an adjuster bolt disposed within said support nut and having a contact tip at one end;

an adjuster having an outer surface for seating against said adjuster seat, a radially extending adjustment arm for engaging said contact tip of said adjuster bolt, and a non-circular aperture for receiving one end of a torsion bar therein, said adjuster bolt being operative to adjust said torsion bar to a predetermined orientation and preload; and a resilient pad disposed on said outer surface of said adjuster and comprising a fabric mat infused with a synthetic rubber for improved vibration isolation and durability of said resilient pad, said resilient pad being operative to reduce noise generated by movement of the torsion bar suspension.

8. A torsion bar adjustment apparatus according to claim 7, wherein said resilient pad further includes an adhesive patch disposed between said outer surface of said adjuster and said resilient pad.

9. A torsion bar adjustment apparatus according to claim 8, wherein said adhesive patch includes a predetermined amount of aluminum filler, whereby said aluminum filler provides an improved bearing surface.

10. A torsion bar adjustment apparatus according to claim 7, wherein said fabric mat is manufactured from KEVLAR.

11. A torsion bar adjustment apparatus according to claim 7, wherein said resilient pad further comprises a fabric mat infused with a synthetic rubber for improved vibration isolation and durability of said resilient pad.

12. A torsion bar adjustment apparatus according to claim 7, wherein said sheet of synthetic rubber includes a predetermined amount of polytetraflouroethylene.

13. A torsion bar adjustment apparatus according to claim 7, wherein said outer surface of said adjuster is spherical.

14. A torsion bar suspension for use in motor vehicle, said suspension comprising:

a structural support member;

an adjuster disposed within said structural support member and having an non-circular aperture therein;

a resilient pad disposed between said adjuster and said structural support member, said resilient pad comprising a synthetic rubber sheet for vibration isolation and a fabric mat for improved durability of said resilient pad;

a wheel support member;

a lower control arm transversely extending from a chassis member to said wheel support member and having a non-circular aperture therein;

a torsion bar extending substantially parallel to a longitudinal axis of said motor vehicle, said torsion bar having opposite ends matingly engaged with respective non-circular apertures of said lower control arm and said adjuster, whereby said resilient pad is operative to reduce noise generated by the operation of the torsion bar suspension.

15. A torsion bar suspension according to claim 14, wherein said resilient pad further includes an adhesive patch disposed between said outer surface of said adjuster and said resilient pad.

16. A torsion bar suspension according to claim 15, wherein said adhesive patch includes a predetermined amount of aluminum filler, whereby said aluminum filler provides an improved bearing surface.

17. A torsion bar suspension according to claim 14, wherein said fabric mat is manufactured from KEVLAR.

18. A torsion bar suspension according to claim 14, wherein said sheet of synthetic rubber includes a predetermined amount of polytetraflouroethylene.

* * * * *